US007963564B2

(12) United States Patent
Flynn et al.

(10) Patent No.: US 7,963,564 B2

(45) Date of Patent: Jun. 21, 2011

(54) LABEL ASSEMBLY FOR APPLYING A LABEL TO AN OBJECT

(75) Inventors: Timothy J. Flynn, Key Largo, FL (US); Patrick J. Flynn, Redlands, CA (US)

(73) Assignee: Continental Datalabel, Inc., Elgin, IL (US)

( * ) Notice: Subject to any disclaimer, the term of this patent is extended or adjusted under 35 U.S.C. 154(b) by 0 days.

(21) Appl. No.: 12/789,904

(22) Filed: May 28, 2010

(65) Prior Publication Data

US 2010/0237604 A1 Sep. 23, 2010

Related U.S. Application Data

(63) Continuation of application No. 11/716,388, filed on Mar. 9, 2007, now Pat. No. 7,726,696, which is a continuation-in-part of application No. 11/585,654, filed on Oct. 24, 2006.

(51) Int. Cl.
*B42D 15/00* (2006.01)
*G09C 3/00* (2006.01)

(52) U.S. Cl. ................. 283/81; 283/67; 283/70; 283/74

(58) Field of Classification Search .................... 281/51; 283/67, 70, 72, 74, 81, 117
See application file for complete search history.

(56) References Cited

U.S. PATENT DOCUMENTS

| | | | | |
|---|---|---|---|---|
| 6,073,377 | A | 6/2000 | Mehta | |
| 6,375,065 | B1 | 4/2002 | Flynn et al. | |
| 6,479,118 | B1 | 11/2002 | Atkinson | |
| 6,776,866 | B2 * | 8/2004 | Flynn et al. | 156/247 |
| 7,140,136 | B2 * | 11/2006 | Flynn et al. | 283/81 |
| 7,726,696 | B2 | 6/2010 | Flynn et al. | |
| 2006/0011076 | A1 | 1/2006 | Durban | |
| 2006/0032764 | A1 | 2/2006 | Swenson | |
| 2008/0093839 | A1 | 4/2008 | Flynn et al. | |
| 2009/0295140 | A1 | 12/2009 | Flynn et al. | |
| 2009/0295143 | A1 | 12/2009 | Flynn et al. | |
| 2010/0102544 | A1 | 4/2010 | Flynn | |
| 2010/0102545 | A1 | 4/2010 | Flynn | |

* cited by examiner

*Primary Examiner* — Dana Ross
*Assistant Examiner* — Justin V Lewis
(74) *Attorney, Agent, or Firm* — Pauley Petersen & Erickson

(57) ABSTRACT

A label assembly that includes a face sheet with at least one label shape defined by one or more tearable lines of separation, a back sheet adjacent to the face sheet, and an adhesive material disposed between the face sheet and the back sheet. The back sheet has a removable panel disposed over the label shape adhesive material and a registration tab aligned with the label shape. The registration tab is raised or raisable above the back sheet to allow an object for labeling to be positioned against the registration tab for proper alignment with the label.

19 Claims, 10 Drawing Sheets

LABEL ASSEMBLY FOR APPLYING A LABEL TO AN OBJECT

CROSS REFERENCE TO RELATED APPLICATION

This application is a continuation of U.S. patent application Ser. No. 11/716,388, filed on 9 Mar. 2007 and issued as U.S. Pat. No. 7,726,696 on 1 Jun. 2010, which is a continuation-in-part of prior U.S. patent application Ser. No. 11/585,654, filed on 24 Oct. 2006. The co-pending parent application is hereby incorporated by reference herein in its entirety and is made a part hereof, including but not limited to those portions which specifically appear hereinafter.

FIELD OF THE INVENTION

This invention is directed to a label assembly for application of a label to a planar surface, such as a compact disc (CD) or a digital video/versatile disc (DVD), or a non-planar, e.g., rounded, surface, such as a pen or pencil. The invention is also directed to a printable sheet of such labels, and a method for printing and applying the printed labels, such as by a consumer.

SUMMARY OF THE INVENTION

One object of the invention is to provide a label assembly for applying a label to a non-planar surface, such as, for example, a pen or pencil having a cylindrical or conical shaft, or a circular, ovular, rectangular, square, hexagonal, octagonal, or other shaped cross-section. Another object of the invention is to provide to provide a label assembly for applying a label to a planar surface, such as a compact disc (CD) or a digital video/versatile disc (DVD) without the need for a separate label application apparatus.

The general object of the invention can be attained, at least in part, through an improvement to a label assembly that includes a face sheet with at least one label shape defined by at least one tearable line of separation, a back sheet adjacent to the face sheet, and an adhesive material disposed between the face sheet and the back sheet. The improvement includes the back sheet having a removable panel disposed over the label shape and a registration structure aligned with a first side of the label shape and the removable panel. The registration structure is one of raised or raisable above the back sheet, to allow the object to be labeled to be positioned against the registration structure for proper alignment with the label. An optional alignment structure can be aligned with a second side of the label shape and the removable panel, the alignment structure one of raised or raisable above the back sheet surface.

The invention further comprehends a label assembly. The label assembly includes a face sheet having a printable surface and an adhesive material coating a surface opposite the printable surface. A label shape is defined in the face sheet by at least one first tearable line of separation. A circle is cut within the face sheet and positioned within the label shape. A back sheet is disposed over the adhesive material. The back sheet includes a surface opposite the adhesive material, and a removable panel defined in the first surface by at least one second tearable line of separation. The removable panel is disposed over the label shape. The label assembly further includes a registration structure aligned with the label shape and the removable panel. The registration structure is one of raised or raisable above the back sheet first surface.

The invention further comprehends a label assembly with a face sheet having a printable surface, an adhesive material coating a surface opposite the printable surface, a label shape defined in the face sheet by at least one first tearable line of separation, and a back sheet disposed over the adhesive material. The back sheet includes a surface opposite the adhesive material, and a removable panel defined in the surface by at least one second tearable line of separation and disposed over the label shape.

A first circle is cut within the face sheet and positioned within the label shape. A second circle is cut within the face sheet and nested within a first perimeter of the first circle. Two opposing removal tabs extend from a periphery of the back sheet removable panel. A first die cut extends in a first arc partially along a perimeter of the first circle in the face sheet and the back sheet. The first arc extends between approximately 1° and 180° along the first circle, and is disposed on a side of the first circle toward a first of the removal tabs. A second die cut extends in a second arc partially along a perimeter of the second circle in the face sheet and the back sheet. The second arc extends between approximately 1° and 180° along the second circle, and is disposed on a side of the second circle toward a second of the removal tabs.

The invention still further comprehends a label assembly including a face sheet having a printable surface, an adhesive material coating a surface opposite the printable surface, a label shape defined in the face sheet by at least one first tearable line of separation, and a back sheet disposed over the adhesive material. The back sheet including a surface opposite the adhesive material, and a removable panel defined in the surface by at least one second tearable line of separation and disposed over the label shape. The label assembly includes a registration structure aligned with the label shape and the removable panel. The registration structure is one of raised or raisable above the back sheet first surface.

A first circle is cut within the face sheet and positioned within the label shape. A second circle is cut within the face sheet and nested within a first perimeter of the first circle. Two opposing removal tabs extend from a periphery of the back sheet removable panel. A first die cut extends in a first arc partially along a perimeter of the first circle in the face sheet and the back sheet. The first arc extends between approximately 1° and 180° along the first circle, and is disposed on a side of the first circle toward a first of the removal tabs. A second die cut extends in a second arc partially along a perimeter of the second circle in the face sheet and the back sheet. The second arc extends between approximately 1° and 180° along the second circle, and is disposed on a side of the second circle toward a second of the removal tabs.

The invention still further comprehends a method for labeling an object. The method uses the label assembly of this invention that includes a registration structure aligned with the label shape and the removable panel.

The method begins with routing the label assembly through a printer and printing on the label shape. Next, the removable panel is removed to expose the adhesive material on the label shape. The object being labeled is placed against the registration structure and the exposed adhesive material. For non-planer surfaces, the object is rolled from the registration structure across the label shape to contact the non-planar surface to the adhesive material, thereby adhering the label shape to the object.

Other objects and advantages will be apparent to those skilled in the art from the following detailed description taken in conjunction with the appended claims and drawings.

DETAILED DESCRIPTION OF THE INVENTION

Figure 1:
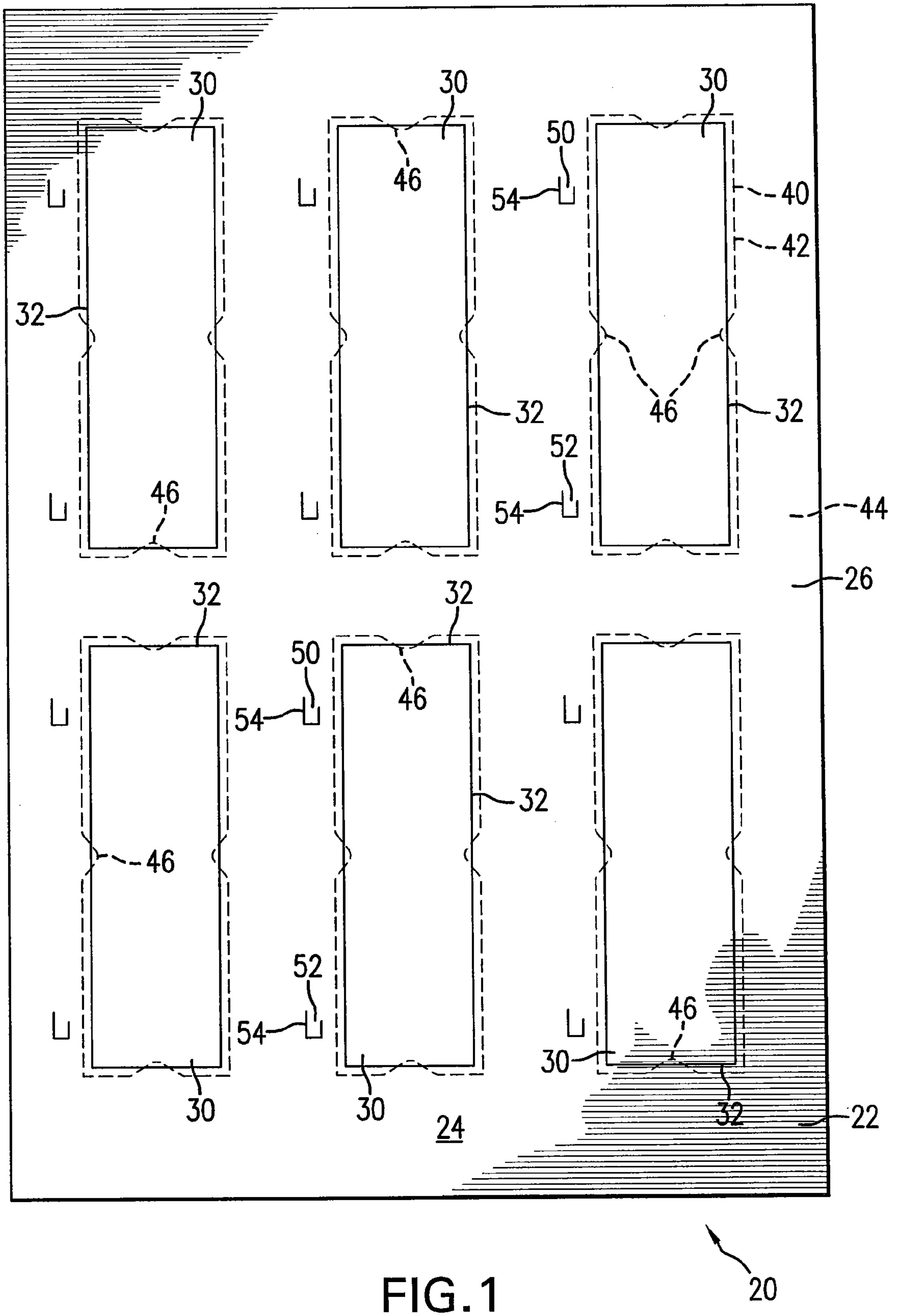
FIG. 1 is a plan view of a label assembly according to one embodiment of this invention.

FIG. 1 shows a label sheet 20 (not necessarily shown to scale) according to one embodiment of this invention. Label sheet 20 is desirably formed of a face sheet 22 and a back sheet (not shown in FIG. 1). The back sheet is desirably about the same size as the face sheet 22, but may be slightly larger or smaller than the face sheet 22. The surface of the face sheet 22 that is disposed toward the back sheet includes an adhesive material coating. The adhesive coating can include any adhesive material known and available to those skilled in the art for forming pressure sensitive, or self-adhesive, labels. The back sheet is desirably formed of a material to which the adhesive coating adheres significantly less than to the face sheet 22, such as is known for forming pressure sensitive, or self-adhesive, labels.

The sheet 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. The face sheet 22 is preferably, but not necessarily, constructed of any suitable paper, paper composite, non-metal and/or metal material that can be used as a label. Other suitable materials for constructing the sheet 22 include fabric, plastic, and metal foils. The adhesive coating covered by the back sheet is applied to the face sheet 22 in any suitable manner known to those skilled in the art. The face sheet 22 desirably has a printable surface 24 on a side opposite the adhesive coating.

The face sheet and the printable surface 24 can be any of a variety of face materials used to make pressure sensitive or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

The face sheet 22 includes a plurality of label shapes 30, each defining in the face sheet 22 an individual label according to this invention. The phrase "shape", or the phrase "removable or tearable shape", is intended to relate to a shape, such as, but not limited to, the rectangular shapes identified in FIG. 1 by element reference numerals 30, that can be torn away from a remaining portion 26 of the face sheet 22, by using tearable lines of separation 32. Tearable lines 32 can be formed as any cutting in face sheet 22 known to those skilled in the art, such as die-cut lines, perforated lines, micro-perforated lines, or any combination of these types of separation, or any other suitable structure that enables separation. A preferred type of tearable line 32 is a line that is die-cut. The label shapes 30 can be die-cut along at least a portion of a periphery, such that the label shapes 30 can be easily removed or separated from the remaining portion 26 of the sheet 22, for example after the sheet 22 is run through a printer.

The back sheet includes a removable panel 40 shown in phantom. The removable panel is defined by tearable lines of separation (shown as dashed lines 42 in FIG. 1) in a surface of the back sheet that is disposed opposite the front sheet 22. A removable panel 40 is disposed over the adhesive coated side of each label shape 30. In the embodiment shown in FIG. 1, the removable panel 40 is desirably and optionally sized slightly larger than the label shape 30. A remaining portion 44 of the back sheet that is disposed around, and desirably surrounding, the removable panel 40 includes a plurality of retainer tabs 46 extending from the remaining portion 44 and adhering to the label shape 30.

The label sheet 20 includes a registration structure, embodied in FIG. 1 as two spaced apart tabs 50 and 52, aligned with each label shape 30 and the removable panel 40. As will be described in more detail below, the registration structure of this invention allows for improved and easier application of a label to an object with a non-planer surface, for example, a pen or a pencil. In the embodiment of FIG. 1, the tabs 50 and 52 are each defined on three sides by a tearable line of separation 54 in both the back sheet and the face sheet 22. The tabs 50 and 52 are raisable to an extended position by folding outward above the back sheet.

Figure 2:
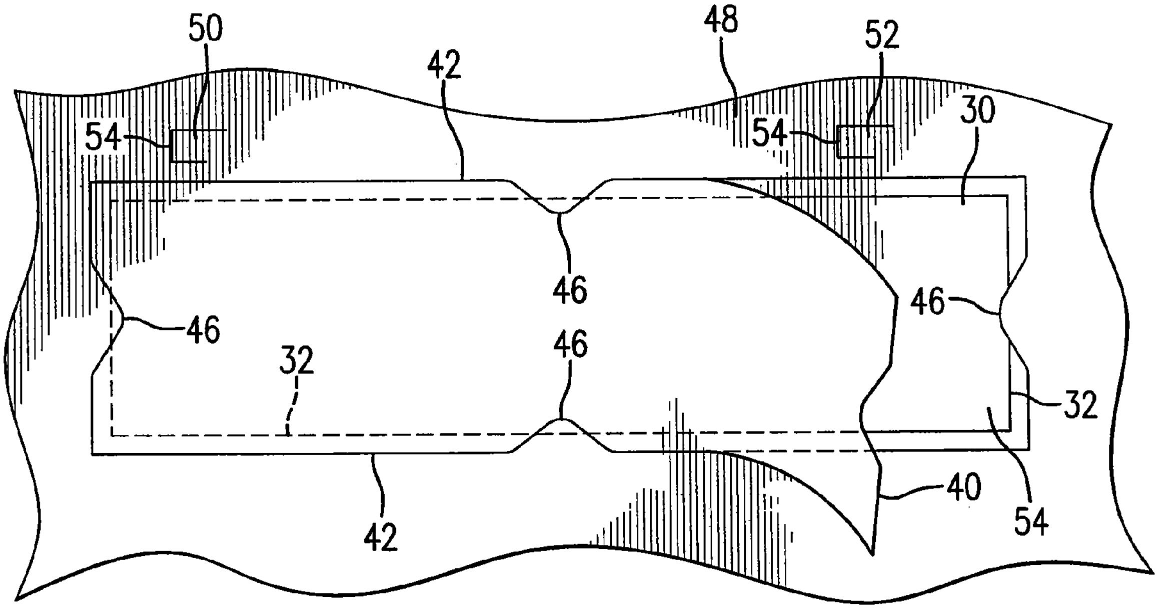
FIG. 2 is a plan view of a portion of the label assembly of FIG. 1, viewed from an opposite side.
Figure 3:
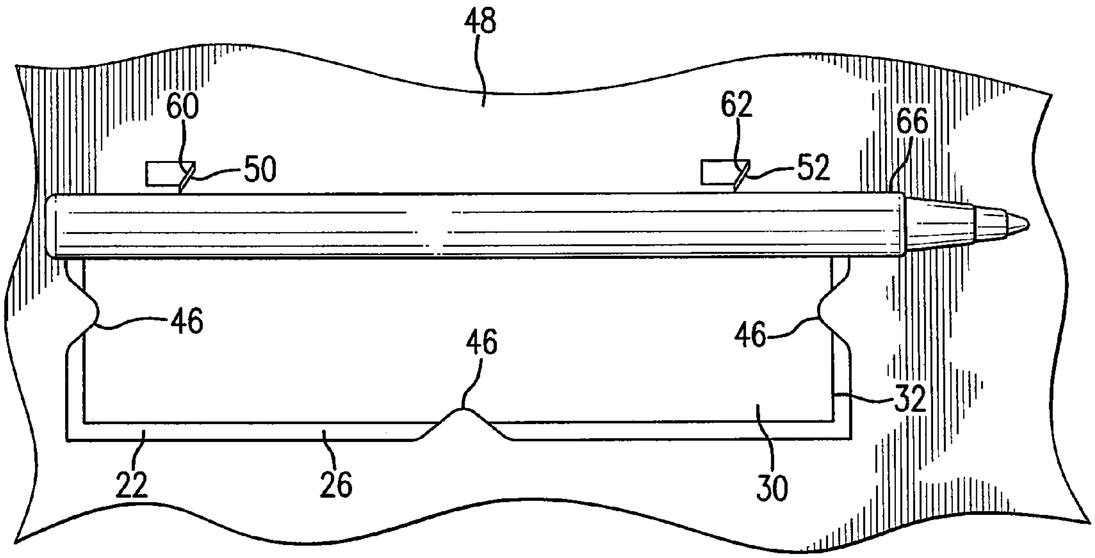
FIGS. 3 and 4 illustrate an operation of the label assembly of FIG. 1.
Figure 4:
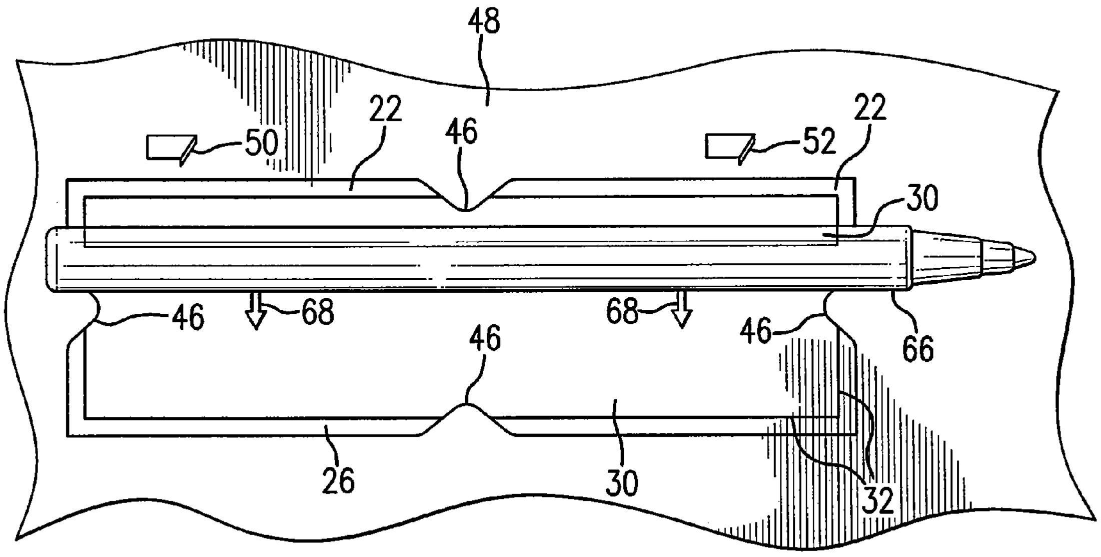

FIGS. 2-4 illustrate the operation of the label sheet 20 of FIG. 1 for labeling an object having a non-planar surface, shown as a pen. Desirably first, the label sheet 20 is routed through a printer to print text and/or graphics onto the printable surface 24 of at least one label shape 30. FIG. 2 shows a printed label shape 30 of sheet 20 placed with the printed face sheet 22 downward on a surface. The removable panel 40 of back sheet 48 is removed along lines of separation 42 to expose the adhesive material 54 on the non-printed side of the label shape 30.

As shown in FIGS. 3 and 4, the tabs 50 and 52 of the registration structure are raised by the user above the surface of the back sheet 48. The tabs 50 and 52 are raised by folding along fold lines 60 and 62, respectively. FIG. 3 shows the label sheet 20 with the removable panel 40 removed and a pen 66 placed against the tabs 50 and 52. As discussed above, desirably the tabs 50 and 52 are formed by one or more die cuts that extend through both of the back sheet 48 and the face sheet 22, thereby desirably providing increased tab thickness and thus rigidity for receiving the pen 66 there against. With the pen 66 against the raised tabs 50 and 52, the pen may or may not be in contact with the adhesive material on the label shape 30 and/or the remaining portion 26. The tabs 50 and 52 desirably assist the user in positioning the pen 66 in proper alignment with the label shape 30 to promote or provide a desirable straight label application. The retainer tabs 46 assist in maintaining the label shape 30 within the face sheet 22 upon removing the removable panel 40 and during positioning of the pen 66 against the tabs 50 and 52.

To apply the label shape 30 to the pen 66, the pen 66 is rolled by the user from the tabs 50 and 52 across the label shape 30, in the direction shown by arrows 68 in FIG. 4. As the pen 66 is rolled, the adhesive material 54 of the label shape 30 adheres to the cylindrical shaft of the pen 66, thereby separating and removing the label shape 30 from the face sheet 22 and adhering the label shape 30 around the pen 66. Thus, the label 30 can be simply and straightly applied to a rounded or other non-planar surface manually by a user. The apparatus and method of this invention can also be incorporated into an automatic or manual label application machine.

The removable panel and the registration structure of this invention allow for relatively easier and better placement of a label onto a rounded or otherwise non-planar surface. As will be appreciated by those skilled in the art following the teachings herein provided, various and alternative sizes, shapes, and configurations are available for the labels, removable panels, and registration structures according to this invention, such as, without limitation, shown in FIGS. 5 and 6.

Figure 5:
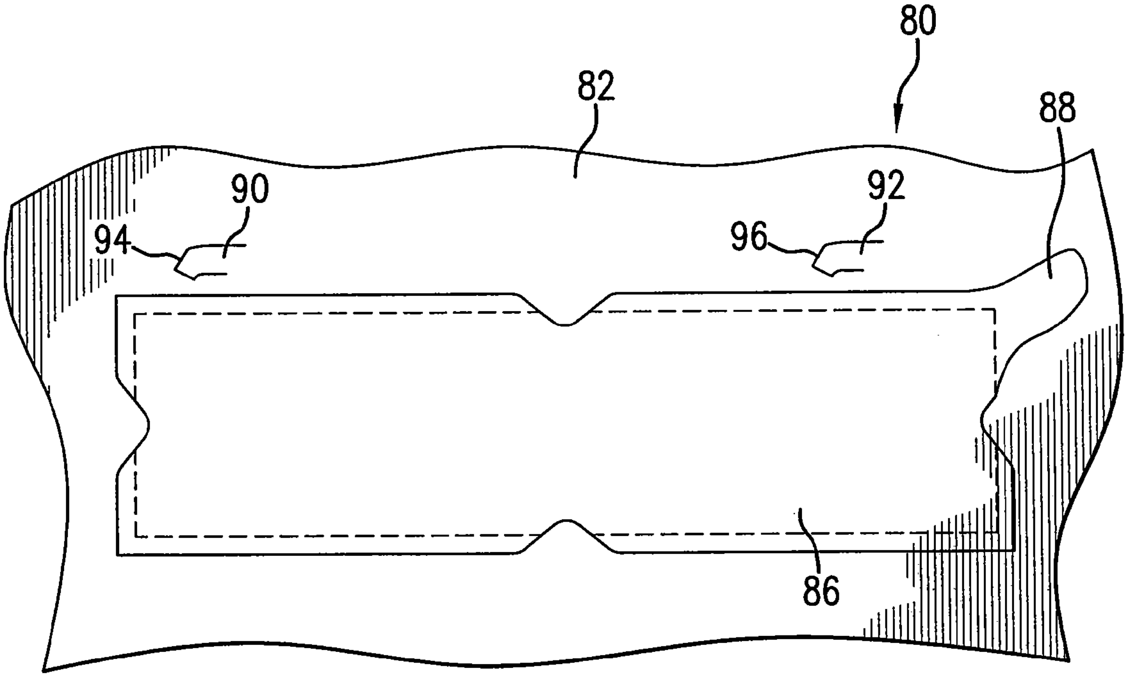
FIG. 5 is a plan view of a portion of a label assembly according to another embodiment of this invention.

FIG. 5 illustrates a portion of a label sheet 80, viewed from the back sheet 82, according to another embodiment of this invention. The label sheet 80 differs from the embodiment of FIG. 1 in the shape of tabs 90 and 92 of the registration structure and removable portion 86. In the embodiment of FIG. 5, the tabs 90 and 92 have bent portions 94 and 96, respectively, that can, for example, desirably form a flat edge that in the raised position is perpendicular to the back sheet 82 and against which a pen or similar object can be placed. In a similar embodiment, the tabs can be formed as hook-like tabs that include a portion that extends over and/or around a portion of the pen or pencil. Also in the embodiment of FIG. 5, the removable portion 86 includes a corner starter flap, or removal tab, 88 that is adapted to allow for easier removal of the removable panel 86 by the user.

Figure 6:
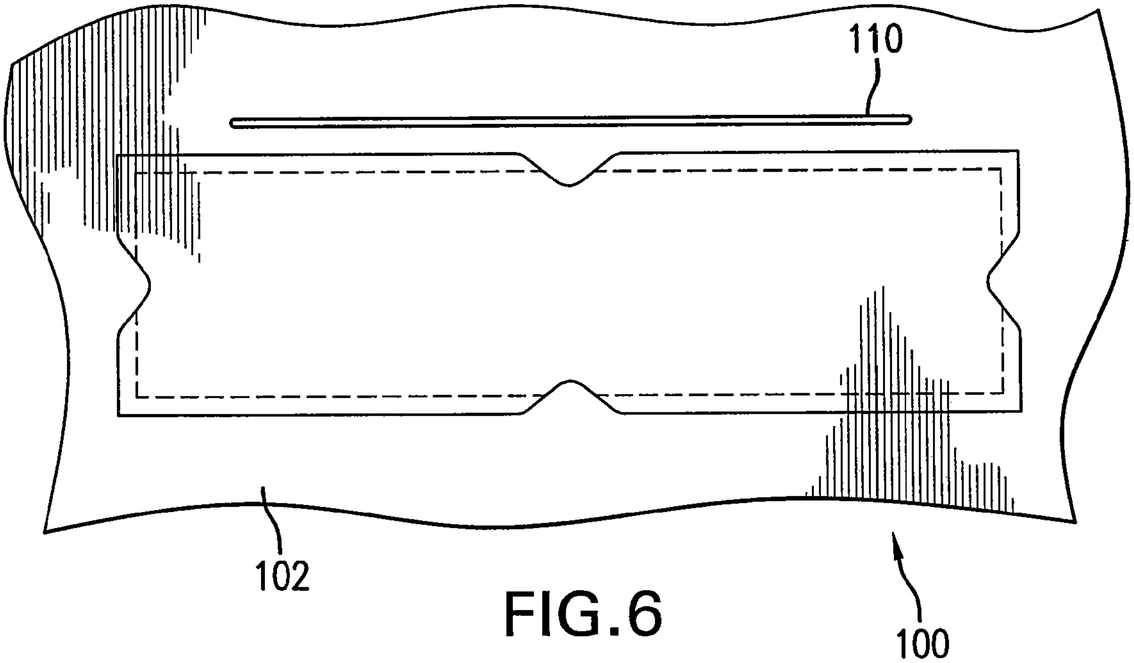
FIG. 6 is a plan view of a portion of a label assembly according to yet another embodiment of this invention.

Other structures than cut-out tabs are available for the registering structure according to this invention. In one embodiment, the registration structure comprises an embossed structure. FIG. 6 shows a label sheet 100 having an embossed structure according to one embodiment of this invention. In FIG. 6, the label sheet 100 includes a back sheet 102. A score line 110 is embossed into the label sheet 100 to provide a raised registration structure against which a pen or other object can be placed for alignment. Desirably, the score line 110 is only as high as is needed for the user to determine when an object is being placed against it. The score line 110 can be formed by scoring the face sheet of the label sheet 100 to cause the score line 110 to be raised above the flat back surface of the label sheet 100 (desirably without cutting through the label sheet 100). As will be appreciated, other embossed or raised shapes are available for the embossed registration structure of this invention, such as, for example, two or more raised domes. Any structure that is or can be raised above the label assembly of this invention, can be used as a registration structure for aligning an object, and is contemplated herein.

Figure 7:
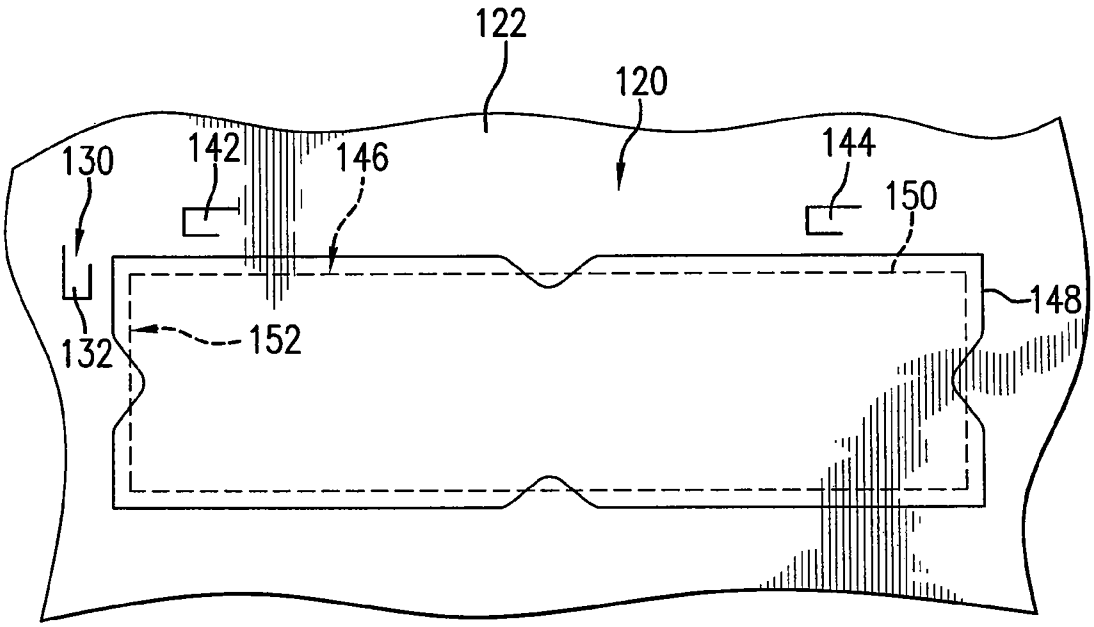
FIG. 7 is a plan view of a portion of a label assembly according to yet another embodiment of this invention.
Figure 8:
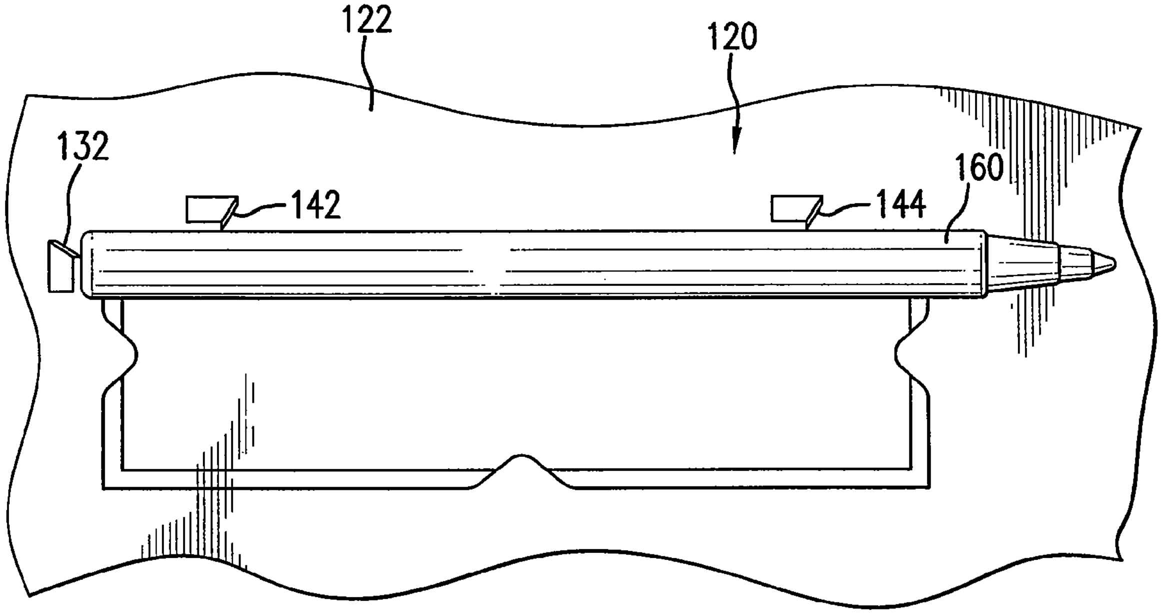
FIG. 8 illustrates an operation of the label assembly of FIG. 7.

FIGS. 7 and 8 illustrate a portion of a label sheet 120, viewed from the back sheet 122, according to another embodiment of this invention. The label sheet 120 differs from the embodiment of FIG. 1 by including an alignment structure 130 in addition to the tabs 142 and 144 forming the registration structure. The alignment structure 130 is formed of a single alignment tab 132, which in this embodiment of the invention is similar is size, shape and function to each of the registration structure tabs 142 and 144.

The registration structure tabs 142 and 144 are disposed adjacent a first side 146 of the label shape 150. The alignment tab 132 is disposed adjacent a second side 152 of label shape 150. As shown in FIG. 8, the alignment structure of this invention desirably acts as an end stop for the pen 160 when the alignment tab 132 is raised above the back sheet 122 by the user. The alignment structure desirably assists in obtaining consistent placement of the labels on the pen. As will be appreciated by those skilled in the art following the teachings herein provided, various sizes, shapes, placements and configurations are available for the alignment structure of this invention. For example, the additional configurations of the registration structure according to this invention, such as, for example, shown in FIGS. 5 and 6, are available for configuration as the alignment structure, depending on need and the object to be labeled. In another embodiment, more than one alignment tab can be placed along side 146, or two alignment tabs can be placed on opposing sides of a label.

Figure 9:
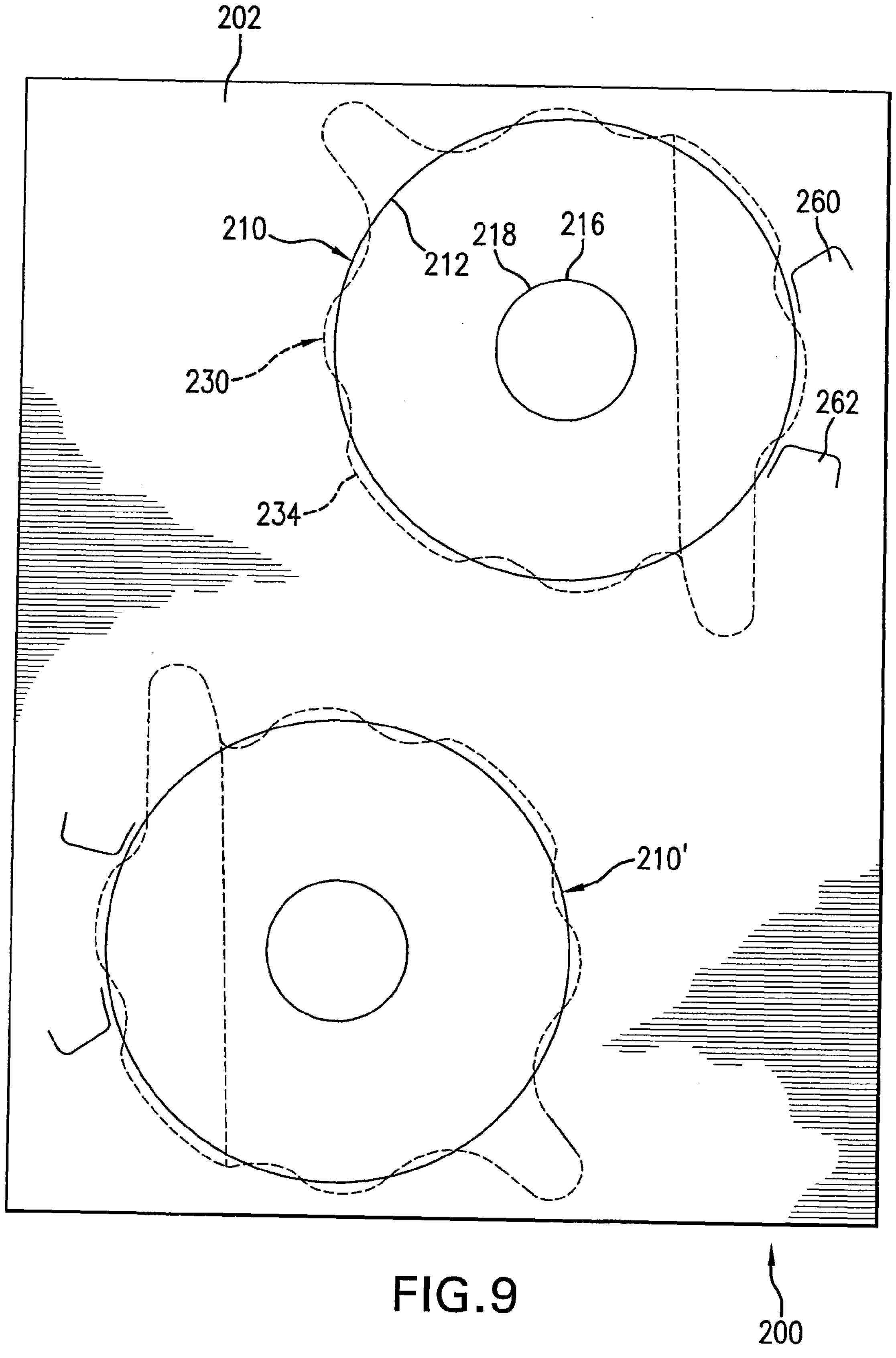
FIG. 9 is a plan view of a label assembly according to yet another embodiment of this invention.
Figure 10:
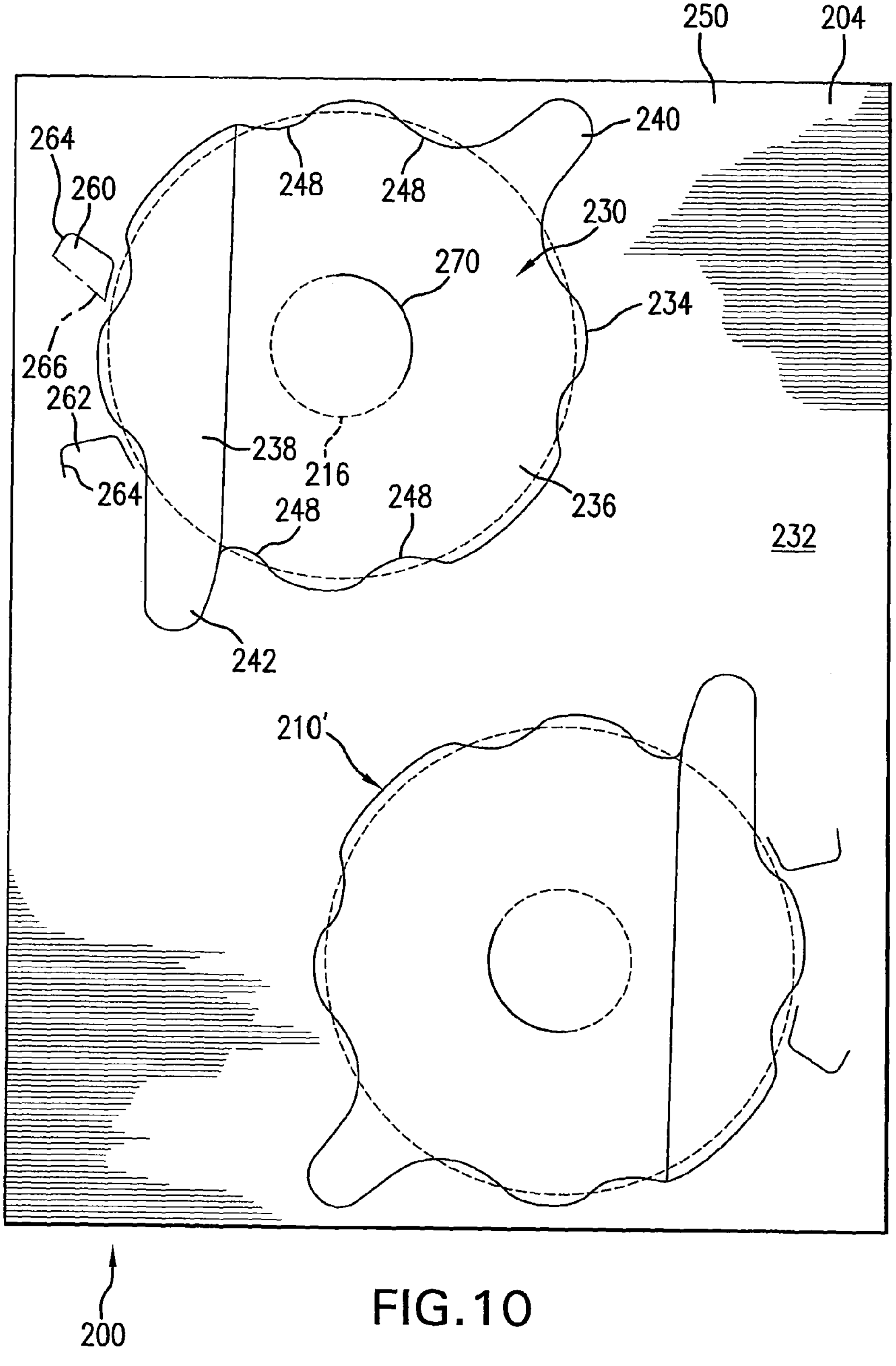
FIG. 10 is a plan view of the back side of the label assembly of FIG. 9.

FIGS. 9 and 10 show a label assembly 200 (not necessarily shown to scale) according to another embodiment of this invention. Label assembly 200 is desirably formed of a face sheet 202 having a printable surface, shown in the view of FIG. 9, and a back sheet 204, shown in the view of FIG. 10. The back sheet 204 is desirably about the same size as the face sheet 202, but may be slightly larger or smaller than the face sheet 202. The surface of the face sheet 202 that is disposed toward the back sheet 204, and opposite the printable surface, includes an adhesive material coating.

The label assembly 200 shown in FIGS. 9 and 10 includes two circular label shapes 210 and 210', which will be described herein with reference to label shape 210. The circular label shape 210 is defined in the face sheet 202 by a first tearable line of separation 212. The circular label shape 210 desirably has a diameter matched to, and preferably slightly smaller than, the diameter of a CD or DVD.

The label assembly 200 further includes a circle 216 cut within the face sheet 202 by a second tearable line 218 and positioned within the label shape 210, preferably positioned in a center position of the label shape 210. The second, smaller circle 216 is desirably approximately equivalent to either a diameter of an inner cut-out circle of the CD or DVD, or a diameter of an inner circle on the CD or DVD where a read/write portion of the CD or DVD adjoins a non-read/write portion of the CD or DVD. The area of label shape 210 between the two tearable lines 212 and 218 can be drawn upon, typed upon, or otherwise printed upon, such as when the sheet 200 is run through a printer, and can then be separated from the back sheet 204 to which the label shape 210 initially adheres. The label shape 210 can then be adhered to a non-read/write side of, for example, a CD or DVD.

The back sheet 204 includes a removable panel 230 defined in the back sheet surface 232 by at least one tearable line of separation 234. The removable panel 230 is disposed over the label shape 210, and as shown in FIGS. 9 and 10, is preferably generally coextensive the label shape 210. In the embodiment shown in FIGS. 9 and 10, the removable panel 230 is optionally divided into two sub-panels 236 and 238, which can assist in applying the label shape 210 to an object, for example, by allowing for only a portion of the removable panel 230 to be removed prior to a first adhesion of the label shape 210 to the object.

According to one preferred embodiment of this invention, the removable panel 230 includes two removal tabs 240 and 242 extending from a periphery of the back sheet removable panel 230. Removal tabs 240 and 242 are desirably positioned on opposing sides of the removable panel 230, such as shown in FIGS. 9 and 10. Removal tabs 240 and 242 are preferably shaped in such a manner so as to facilitate peeling away of removable panel 230. In this embodiment, removal tab 240 is associated with sub-panel 236 and removal tab 242 is associated with sub-panel 238. As will be appreciated, the different angling of removal tab 242, as compared to the angle of removal tab 240, facilitates the removal of the relatively narrow sub-panel 238. The back sheet 204 also includes a plurality of retainer tabs 248 extending from a remaining portion 250 and adhering to the label shape 210. As discussed above, the retainer tabs 248 are particularly useful in holding the label shape 210 in place (and attached to the remainder of the front sheet 202) while removing the removable panel 230 to expose the adhesive material on the label shape 210.

The label assembly 200 includes a registration structure, embodied in FIGS. 9 and 10 as two spaced apart registration tabs 260 and 262, aligned with the label shape 210. As will be described in more detail below, the registration structure of this embodiment allows for improved and easier application of a label to an object, for example, a CD or DVD. The tabs 260 and 262 are each defined on three sides by a tearable line of separation 264 in both the back sheet 204 and the face sheet 202. The tabs 260 and 264 are raisable to an extended position by folding outward above the back sheet 204. In FIG. 10, fold line 266 shows where the tab 260 will desirably be folded, and can be imaginary or a perforated or otherwise scored fold line.

According to one preferred embodiment of this invention, when the removable panel 230 is peeled away or otherwise removed from label shape 210, a center hole in label shape 210 is opened by the removal of the portion of the label assembly 200 within circle 216. In the embodiment of this invention shown in FIGS. 9 and 10, the center hole of label shape 210, defined by circle 216, may be opened upon removal of the removable panel sub-panel 236 using a die cut 270 extending partially along a perimeter of the circle 216 and in both face sheet 202 and back sheet 204. A similar use of such a die cut is described in commonly assigned U.S. Pat. No. 6,881,461, herein incorporated by reference.

The die cut 270 is preferably generally arcuate and positioned along a side of the circle 216 that corresponds with a side of the first circle 216 that is removed first. As shown in FIG. 10, the die cut 270 is disposed on the side of circle 216 toward the removal tab 240. According to an embodiment of die cut 270 having an arcuate shape, the arc preferably extends between approximately 1° and 180° along the circle 216 and more preferably extends between approximately 5° and 90° along the circle 216. Alternative designs for facilitating the removal of the portion of the label assembly 200 within circle 216 are also available for use in this invention.

Figure 11:
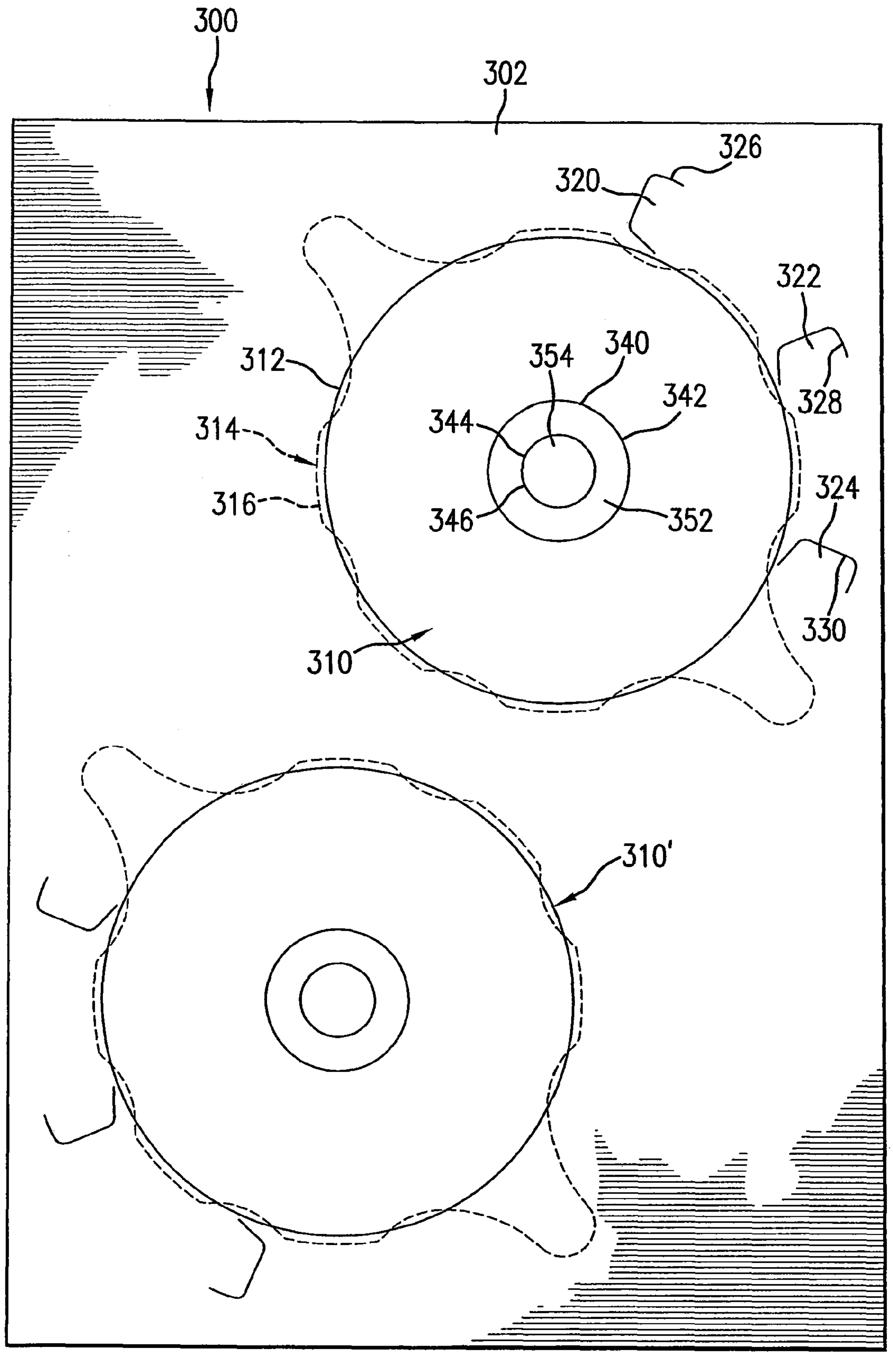
FIG. 11 is a plan view of a label assembly according to yet another embodiment of this invention.
Figure 12:
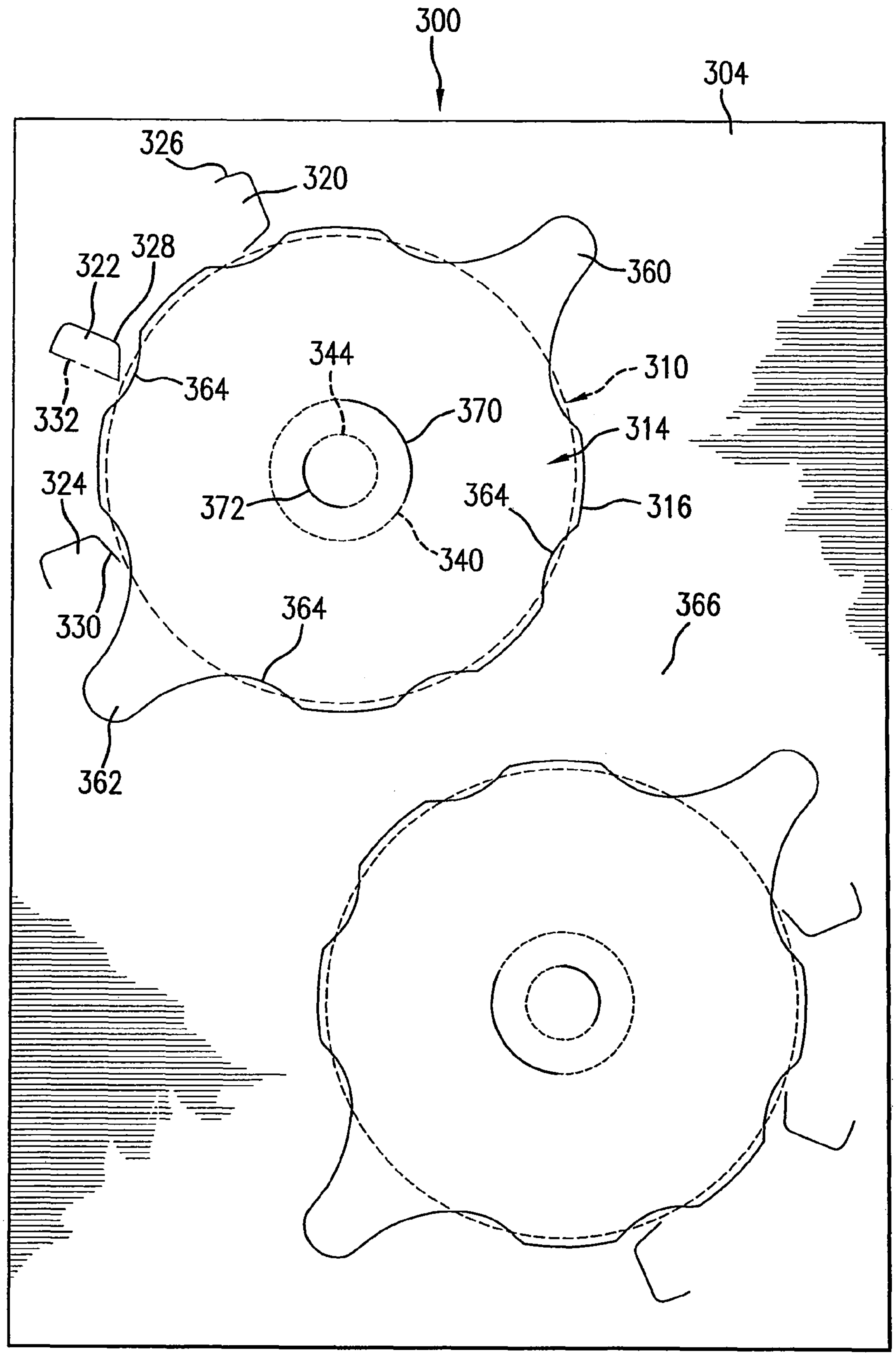
FIG. 12 is a plan view of the back side of the label assembly of FIG. 11.

FIGS. 11 and 12 illustrate a label assembly 300 according to yet another embodiment of this invention. The label assembly 300 includes a front sheet 302 having a printable surface and an adhesive material coating a surface opposite the printable surface. A back sheet 304 is disposed over the adhesive material.

Two label shapes 310 and 310' are defined in the face sheet 302, and will be discussed herein with reference to label shape 310. Circular label shape 310, appropriately sized for use in labeling a CD or DVD, is defined in the face sheet by a tearable line of separation 312. A removable panel 314 is defined in the surface of the back sheet 304 by a tearable line of separation 316, and is disposed over the label shape 310.

The label assembly 300 includes a registration structure aligned with the label shape 310 and the removable panel 314. In the embodiment of FIGS. 11 and 12, the registration structure includes three spaced apart registration tabs 320, 322, and 324, each defined on three sides by a tearable line of separation 326, 328, and 330, respectively, in both the back sheet 304 and the face sheet 302. The registration tabs 320, 322, and 324 are raisable above the back sheet by folding outward, such as about the fold line 332.

A first circle 340 is cut within the face sheet 302 by a tearable line of separation 342 and positioned within the label shape 310. A second circle 344 is also cut within the face sheet 302 by a tearable line of separation 346, and nested within a first perimeter of the first circle 340. A plurality of nested circular removable label shapes 310, 352, and 354 are thus located within the circle formed by tearable line 312. As discussed above, the ring-shaped removable label shape 310 formed between tearable lines 312 and 342 can be adhered to a non-read/write side of the read/write portion of a CD or DVD as a label. Similarly, the ring-shaped removable shape 352 formed between tearable lines 342 and 346 can be adhered to the small non-read/write portion of a CD or DVD as a label. The removable shape 354 is desirably sized to leave an opening that corresponds to the center opening of a CD or DVD.

Various and alternative sizes, shapes, and configurations are available for the removable label shapes of this invention. For example, label shapes 310, 352, and 354 are preferably but not necessarily ring-shaped or circular, as label shapes 310, 352, and 354 can also have any polygonal shape or any other suitable non-circular shape. As another example, an optional further ring-shaped portion (not shown) can be formed between shapes 310 and 352 to serve as a discardable spacer.

The back sheet removable panel 314 includes two removal tabs 360 and 362 extending from a periphery of the removable panel 314. Removal tabs 360 and 362 are desirably positioned on opposing sides of the removable panel 314. As discussed above, removal tabs 360 and 362 are preferably shaped in such a manner so as to facilitate peeling away of removable panel 314. The back sheet 304 also includes a plurality of retainer tabs 364 extending from a back sheet remaining portion 366 and adhering to the label shape 310. The retainer tabs 364 assist in holding the label shape 310 in place, e.g., and attached to the remainder of the front sheet 202, while removing the removable panel 314 to expose the adhesive material on the back side of the label shape 310. In the embodiment shown in FIGS. 11 and 12, each of the spaced apart registration tabs 320, 322, and 324 is aligned with one of the plurality of retainer tabs 364.

According to one preferred embodiment of this invention, when the removable panel 314 is peeled away or otherwise removed from label shape 310, a center hole in label shape 310 is opened by the removal of either only label shape 354 or both label shapes 352 and 354. In the embodiment shown in FIGS. 11 and 12, whether only shape 354 is removed with the removable panel 314 or both shapes 352 and 354 are removed with the removable panel 314 is controlled by which of removal tabs 360 and 362 is used to remove the removable panel 314.

The label assembly 300 includes a first die cut 370 extending in a first arc partially along a perimeter of the first circle 340 and in the face sheet 302 and the back sheet 304. A second die cut 372 extends in a second arc partially along a perimeter of the second circle 344 and in the face sheet 302 and the back sheet 304.

Both the first and second arcs extend between approximately 1° and 180°, and more desirably between approximately 5° and 90°, along the first and second circles 340 344, respectively. The first arc die cut 370 is disposed on a side of the first circle 340 toward the first removal tab 360. The second arc die cut 372 is disposed on a side of the second circle 344 toward the second removal tab 362.

Removing the removable panel 314 by grasping removal tab 360 and peeling removable panel 314 from the back sheet 304 (generally in a direction toward the opposing tab 362) results in removal of both label shapes 352 and 354 from the front sheet 302. The die cut 370 desirably causes the label shapes 352 and 354 to continue adhering to the removable panel 314 and to separate (along tearable line 342) from the front sheet 302. Removing the removable panel 314 by grasping the second removal tab 362 and peeling removable panel 314 from the back sheet 304 (generally in a direction toward the opposing tab 360) desirably results in removal of only label shape 354 from the front sheet 302. As there is not die cut like die cut 370 in this direction along the perimeter of circle 340, the shape 352 remains attached to the front sheet 302. The die cut 372 causes the label shape 354, however, to continue adhering to the removable panel 314 and to separate (along tearable line 344) from the front sheet 302. Thus the label assembly user can choose between two alternative shapes of label shape 310, i.e., one version keeping the shape portion 352 attached to cover more surface of the CD or DVD, or a second version without the shape portion 352.

The invention further provides a method for labeling an object using the label assembly, such as label assembly 300. First, the label assembly user routes the label assembly 300 through a printer to print the desired text and/or graphic on the printable surface of label shape 310. The label assembly 330 is desirably placed on a flat hard surface with the printed face sheet 302 downward. The user removes the removable panel 314 using one of the two opposing removal tabs 360 or 362 to expose the adhesive material on the label shape 310. The user raises the registration structure by breaking the tearable lines 326, 328 and 330 and folding the registration tabs 320, 322, and 324 above the surface of the back sheet 304. The user then places the object against the registration tabs 320, 322, and 324 and then lowers the object to adhere the label shape 310 to the object.

Figure 13:
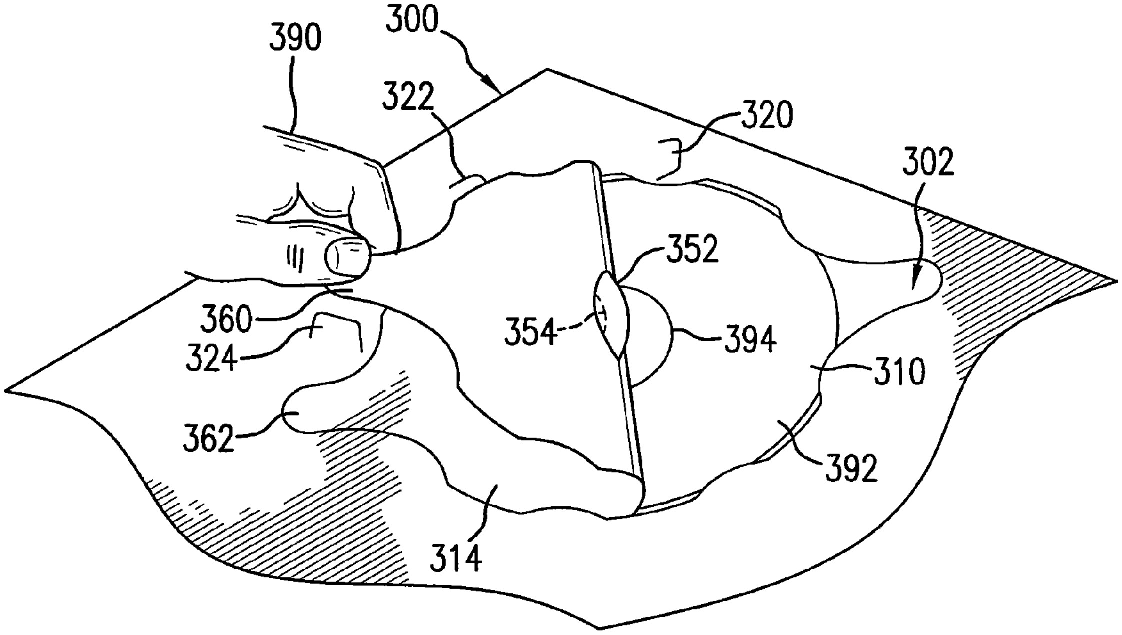
FIGS. 13 and 14 illustrate an operation of the label assembly of FIGS. 11 and 12.
Figure 14:
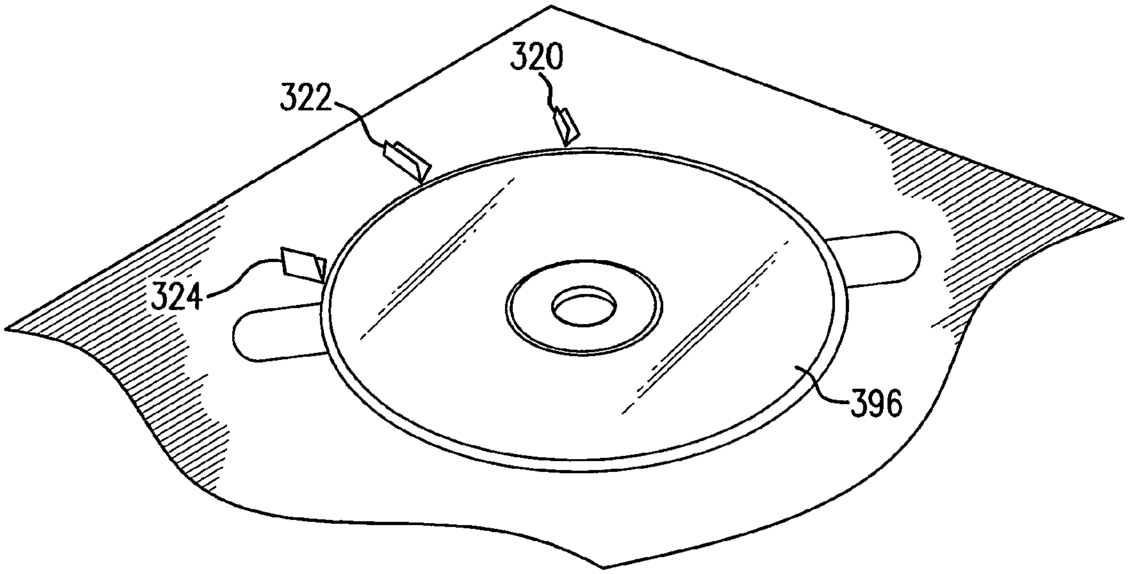

FIGS. 13 and 14 illustrate the use of the label assembly 300. In FIG. 13, the user 390 is peeling the removable panel 314 from the back sheet 304 to expose the adhesive coated side 392 of the label shape 310. The user 390 is peeling by grasping removal tab 360, and thus both label shapes 352 and 354 are removed from the front sheet 302 and stay adhered to the removable panel 314 to provide an opening 394 in label shape 310.

In FIG. 14, the registration tabs 320, 322, and 324 are folded upward, the removable panel 314 is fully removed, and compact disc 396 is placed against the registration tabs 320, 322, and 324 and on the adhesive side of the label shape 310.

Placing the compact disc 396 against registration tabs 320, 322, and 324 facilitates proper alignment of the compact disc 396 over the label shape 310, thereby promoting the desired placement of the label shape 310 on the compact disc 396 without a separate label application apparatus. The labeled compact disc 396 can then simply be lifted from the label assembly 300.

Thus the invention provides a label assembly with a registration structure that promotes the desired straightened and/or central alignment of a label to an object. The label assembly of this invention allows for application of a label to an object without the need for a separate label application apparatus, while still providing the desired placement on the object, such as centered placement of a label on a CD or DVD.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A label assembly, comprising:

a face sheet having a printable surface and an adhesive material coating a surface opposite the printable surface;

a label shape defined in the face sheet by at least one first tearable line of separation;

a back sheet disposed over the adhesive material;

a removable panel defined in the back sheet surface by at least one second tearable line of separation and disposed over the label shape;

a raised or raisable tab defined in the back sheet and disposed along a side of the label shape or the removable panel.

2. The label assembly according to claim 1, further comprising a second raised or raisable tab defined in the back sheet and disposed along a second side of the label shape or the removable panel.

3. The label assembly according to claim 1, wherein the back sheet comprises a remaining portion disposed around the removable panel and the raised or raisable tab extends from the remaining portion.

4. The label assembly according to claim 1, wherein the raised or raisable tab is disposed outside of the outer periphery of the removable panel and aligned with the label shape or the removable panel, wherein the raised or raisable tab is raisable by folding outward above the back sheet.

5. The label assembly according to claim 1, wherein the raised or raisable tab is defined by a tearable line of separation in at least the back sheet and connected to the back sheet by a fold line.

6. The label assembly according to claim 1, further comprising at least two raised or raisable tabs defined in the back sheet and disposed spaced apart along the side of the label shape or the removable panel, each of the at least two raised or raisable tabs defined on sides by a tearable line of separation in at least the back sheet, wherein the registration tabs are raisable by folding outward above the back sheet.

7. The label assembly according to claim 1, additionally comprising:

a removal tab extending from a periphery of the back sheet removable panel;

a removable shape cut in the face sheet within an outer perimeter of the label shape; and a die cut in the back sheet extending partially along a perimeter of the removable shape and disposed on a side of the removable shape toward the removal tab.

8. A label assembly, comprising:

a face sheet having a printable surface and an adhesive material coating a surface opposite the printable surface;

a label shape defined in the face sheet by at least one first tearable line of separation;

a back sheet disposed over the adhesive material, the back sheet including a removable panel defined by at least one second tearable line of separation and disposed over at least a portion of the label shape;

a first raised or raisable tab cut from the back sheet and disposed along a first side of the label shape or the removable panel;

a second raised or raisable tab cut from the back sheet and disposed along a second side of the label shape or the removable panel;

a removable shape having a perimeter cut in the face sheet within an outer perimeter of the label shape; and a die cut in the back sheet extending partially along the perimeter of the removable shape.

9. The label assembly according to claim 8, additionally comprising a removal tab extending from a periphery of the removable panel, wherein the die cut in the back sheet is disposed on a side of the removable shape toward the removal tab.

10. The label assembly according to claim 8, wherein the back sheet comprises a remaining portion disposed around the removable panel and at least one of the first or second raised or raisable tab extends from the remaining portion.

11. The label assembly according to claim 8, wherein at least one of the first or second raised or raisable tab is disposed outside of the outer periphery of the removable panel and aligned with the label shape or the removable panel, wherein the raised or raisable tab is raisable by folding outward above the back sheet.

12. The label assembly according to claim 1, wherein at least one of the first or second raised or raisable tab is defined by a tearable line of separation in at least the back sheet and connected to the back sheet by a fold line.

13. The label assembly according to claim 1, further comprising at least two first raised or raisable tabs defined in the back sheet and disposed spaced apart along the first side of the label shape or the removable panel, each of the at least two first raised or raisable tabs defined on sides by a tearable line of separation in at least the back sheet, wherein the registration tabs are raisable by folding outward above the back sheet.

14. A method for labeling an object with a label from a label assembly, the method comprising:

providing a label assembly including a face sheet with a label shape defined by at least one tearable line of separation, a back sheet adjacent to the face sheet, an adhesive material disposed between the face sheet and the back sheet, a removable panel disposed over at least a portion of the label shape, and a raisable tab defined in the back sheet and disposed along a side of the label shape or the removable panel;

removing the removable panel to expose the adhesive material on at least a portion of the label shape;

raising the raisable tab above the back sheet;

placing the object or the label assembly on a surface, wherein the label assembly is placed on the surface with the face sheet downward on the surface;

aligning the object and label assembly with the raised tab;

adhering the label shape to the object while the object is against the raised tab; and removing the object with the adhered label shape from the label assembly.

15. The method of claim 14, wherein the raisable tab is defined by at least one tearable line of separation in the back sheet and is connected to the back sheet by a fold line, and further comprising raising the raisable by folding at the fold line.

16. The method of claim 14, further comprising routing the label assembly through a printer and printing on the label shape before removing the removable panel or raising the raisable tab.

17. The method of claim 14, wherein the label assembly further comprises a removal tab extending from a periphery of the removable panel, a removable shape cut in the face sheet within an outer perimeter of the label shape, and a die cut in the back sheet extending partially along a perimeter of the removable shape and disposed on a side of the removable shape toward the removal tab, and the method further comprising:

pulling the removal tab toward the die cut to remove the removable panel with the removable shape adhered thereto.

18. The label assembly according to claim 1, wherein the back sheet is formed of a material to which the adhesive coating adheres significantly less than to the face sheet.

19. The label assembly according to claim 8, wherein the back sheet is formed of a material to which the adhesive coating adheres significantly less than to the face sheet.

* * * * *